(12) United States Patent
Li

(10) Patent No.: US 8,090,763 B2
(45) Date of Patent: Jan. 3, 2012

(54) METHOD AND APPARATUS FOR CROSS-DOMAIN COMMUNICATION USING DESIGNATED RESPONSE PROCESSING PAGE

(75) Inventor: Zhanyuan Li, Hangzhou (CN)

(73) Assignee: Alibaba Group Holdings Limited (KY)

( * ) Notice: Subject to any disclaimer, the term of this patent is extended or adjusted under 35 U.S.C. 154(b) by 102 days.

(21) Appl. No.: 12/583,362

(22) Filed: Aug. 18, 2009

(65) Prior Publication Data

US 2010/0049782 A1 Feb. 25, 2010

(30) Foreign Application Priority Data

Aug. 25, 2008 (CN) .......................... 2008 1 0147259

(51) Int. Cl.
*G06F 15/16* (2006.01)
*G06F 15/173* (2006.01)
*G06F 15/177* (2006.01)

(52) U.S. Cl. ........ 709/202; 715/231; 715/234; 715/765; 709/224

(58) Field of Classification Search .......... 709/200–203, 709/217–228; 715/231, 234, 765
See application file for complete search history.

(56) References Cited

U.S. PATENT DOCUMENTS

| | | | |
|---|---|---|---|
| 5,142,622 A | 8/1992 | Owens | |
| 5,802,590 A | 9/1998 | Draves | |
| 5,895,499 A | 4/1999 | Chu | |
| 5,961,593 A | 10/1999 | Gabber et al. | |
| 6,125,384 A | 9/2000 | Brandt et al. | |
| 6,934,757 B1 | 8/2005 | Kalantar et al. | |
| 7,640,512 B1 * | 12/2009 | Appling | 715/771 |
| 2007/0113237 A1 | 5/2007 | Hickson | |
| 2007/0256003 A1 * | 11/2007 | Wagoner et al. | 715/501.1 |
| 2007/0299735 A1 | 12/2007 | Mangalick et al. | |
| 2007/0299857 A1 * | 12/2007 | Gwozdz et al. | 707/102 |
| 2007/0300064 A1 | 12/2007 | Isaacs et al. | |
| 2008/0010359 A1 * | 1/2008 | Achtermann et al. | 709/217 |
| 2008/0033956 A1 * | 2/2008 | Saha et al. | 707/9 |
| 2008/0034441 A1 * | 2/2008 | Saha et al. | 726/27 |
| 2008/0046562 A1 * | 2/2008 | Butler | 709/224 |
| 2008/0281944 A1 * | 11/2008 | Vorne et al. | 709/218 |
| 2008/0298342 A1 * | 12/2008 | Appleton et al. | 370/351 |
| 2009/0006996 A1 * | 1/2009 | Saha et al. | 715/765 |
| 2009/0037806 A1 * | 2/2009 | Yang et al. | 715/234 |
| 2009/0037935 A1 * | 2/2009 | Saha et al. | 719/318 |
| 2009/0199083 A1 * | 8/2009 | Sar et al. | 715/231 |

(Continued)

OTHER PUBLICATIONS

U.S. Appl. No. 11/426,174, Gwozdz et al.

*Primary Examiner* — Haresh N Patel
(74) *Attorney, Agent, or Firm* — Van Pelt, Yi & James LLP

(57) ABSTRACT

Cross-domain communication between a sender domain and a receiver domain includes: receiving, in the receiver domain, a data request from the sender domain, the data request being directed to a designated request processing page in the receiver domain; processing the data request to generate a response; and sending the response to the sender domain, the response being directed to a designated response processing page in the sender domain. Alternatively, cross-domain communication includes receiving, in the receiver domain, a data request from the sender domain, the data request being directed to a designated request processing page in the receiver domain; processing the data request to generate a response; and sending the response to the sender domain, the response being directed to a designated response processing page in the sender domain.

17 Claims, 7 Drawing Sheets

U.S. PATENT DOCUMENTS

2009/0248494 A1* 10/2009 Hueter et al. .................. 705/10
2009/0293018 A1* 11/2009 Wilson et al. ................. 715/811
2009/0328063 A1* 12/2009 Corvera et al. ............... 719/315
2010/0088354 A1* 4/2010 Wu et al. ...................... 707/827

* cited by examiner

US 8,090,763 B2

METHOD AND APPARATUS FOR CROSS-DOMAIN COMMUNICATION USING DESIGNATED RESPONSE PROCESSING PAGE

This application claims priority to People's Republic of China Patent Application No. 200810147259.3 entitled METHOD, SYSTEM AND DEVICE FOR CROSS-DOMAIN COMMUNICATION filed Aug. 25, 2008 which is incorporated herein by reference for all purposes.

FIELD OF THE PRESENT INVENTION

The present invention relates generally to the field of network technology and more particularly to method, system and device for cross-domain communication.

BACKGROUND OF THE PRESENT INVENTION

Existing browser software such as Internet Explorer or Firefox provides a security isolation mechanism based on network domains to prevent programs from different websites from accessing each other's data and causing visitor's private data to be misappropriated from one website to another. Some large web platforms, however, can include many different domain names or different websites that are in trust relationships with each other and often need to exchange data and service among different websites.

Several techniques for cross-domain communication exist. Current techniques, however, usually have certain disadvantages.

One existing technique for cross-domain communication involves exploiting certain security holes in the browser. This is not secure since malicious websites can also use security vulnerabilities to launch attacks. Also, the technique becomes obsolete as soon as the security holes are patched.

Another technique for cross-domain communication involves decreasing the client browser security setting to allow for cross-domain visits. Decreasing the security standard, however, makes the client more vulnerable to exploits by malicious websites.

Another technique involves URL jumping between different websites, where one website requests a page in another domain and sends information in the form of URL parameters and the other domain returns information by redirecting the browser to the web page in the requester's domain and sending information in the form of URL parameters. When URL jumping is used to communicate between different websites, the servers must deal with greatly increased load and efficiency is decreased. The technique also leads to security problems since the data information transferred via the URL is in plain view in the address bar of browser. Further, the technique cannot transfer large amounts of data because of the limit on the URL length.

Another technique uses cross-domain scripting citation. A web page in a domain uses the <script> label to reference Javascript (JS) file contents of another domain and transfers the data in the form of URL parameters. The JS file of the other domain can compile script freely to send the data directly to the current web page. This technique tends to be complex since new script needs to be generated in each communication. Further, the data of one domain would be completely exposed to the script of another and can be easily misappropriated.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Cross-domain communication is disclosed. As used herein, a domain refers to a collection of network devices organized under a common network name, such as www.example.com. The techniques can be used for implementing safe communication among different domains while guaranteeing security isolation of domains with respect to browser software.

Figure 1:
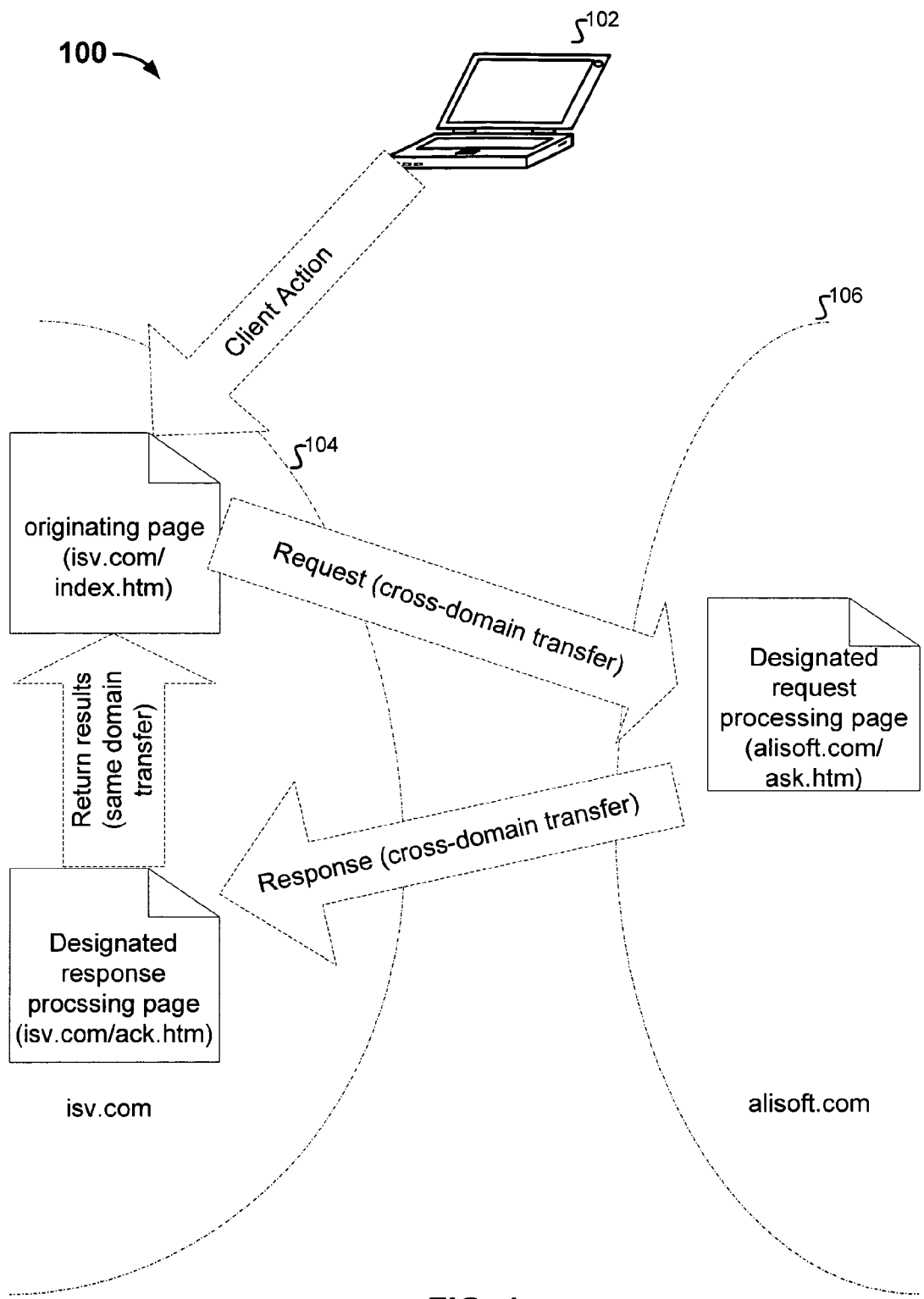
FIG. 1 is a block diagram illustrating an embodiment of a system that supports cross-domain communication.

FIG. 1 is a block diagram illustrating an embodiment of a system that supports cross-domain communication. In this example, system 100 includes a first domain 104 and a second domain 106, which in this example are shown to be isv.com and alisoft.com, respectively. For purposes of example, in the following discussion domain 104 is presumed to be the domain from which a data request is sent and is referred to as the first domain or the sender domain and domain 106 is presumed to be the domain to which a data request is received and is referred to as the second domain or the receiver domain. Communication in the reverse direction where domain 106 is the sender domain and domain 104 is the receiver domain is possible. One or more servers are included in the domains to provide web services such as displaying web pages and responding to client requests. In some embodiments, different physical servers are included in different domains. In some embodiments, a physical server device is virtualized to operate as multiple virtual servers that separately service different domains.

Within domain 104, there are one or more web pages that can be accessed by client devices such as 102 via client software such as a web browser. A designated response processing page (also referred to as the ACK page), in this case with the Universal Resource Locator (URL) of isv.com/ack.htm, is also included in the sender domain. Within domain 106, a designated request processing page (also referred to as the ASK page), in this case with the URL of alisoft.com/ask.htm, is configured to handle cross-domain transfer requests from outside domains such as domain 104. Details of the page configurations and operations are described below.

Figure 2A:
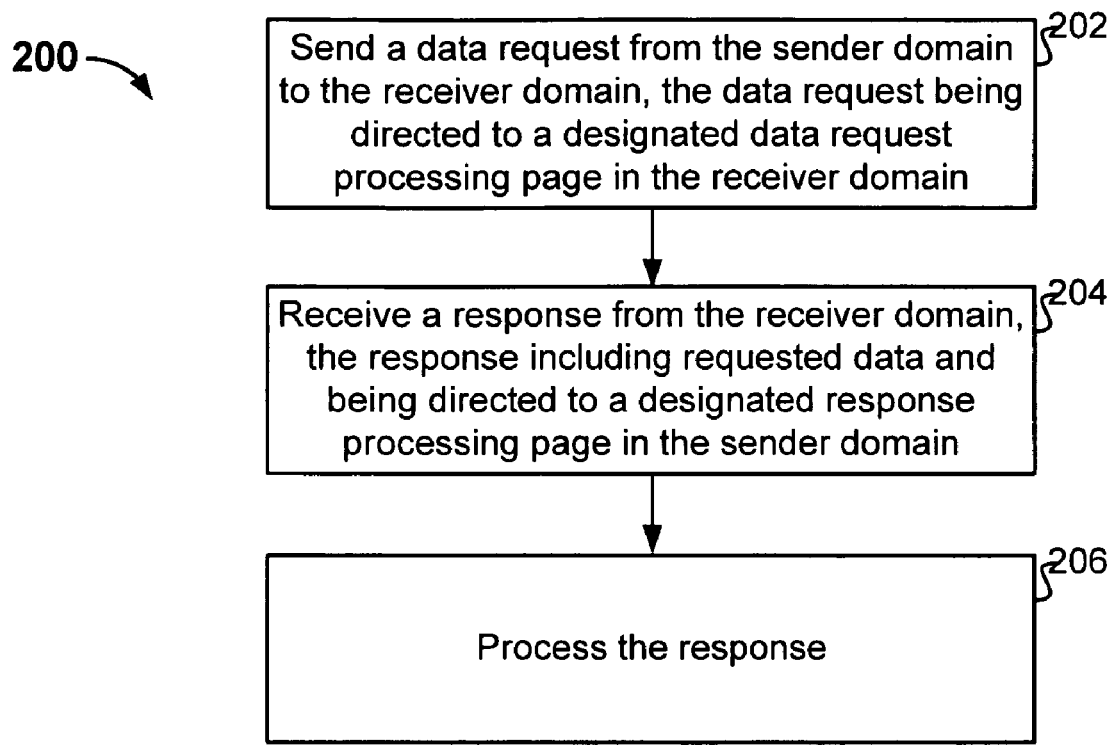
FIG. 2A is a flowchart illustrating an embodiment of a process for cross-domain communication.

FIG. 2A is a flowchart illustrating an embodiment of a process for cross-domain communication. Process 200 may be implemented on a device such as a server implementing services for domain 104.

At 202, a data request is sent from the sender domain to the receiver domain. The request may be evoked in response to a client action that is made on a webpage that is not specifically designated for cross-domain communication. Such a webpage is referred to as an originating page. As will be described more fully below, the data request is sent to a designated request processing page in the receiver domain. The designated request processing page is specifically configured to respond to cross-domain data request.

At 204, a response is received from the receiver domain. If the communication session is successful, the response would include requested data. The response is directed to a designated response processing page in the sender domain. The response is processed by the response processing page and information is passed to the originating page as appropriate.

At 206, the response is processed and can be passed on to the originating page as appropriate.

Figure 2B:
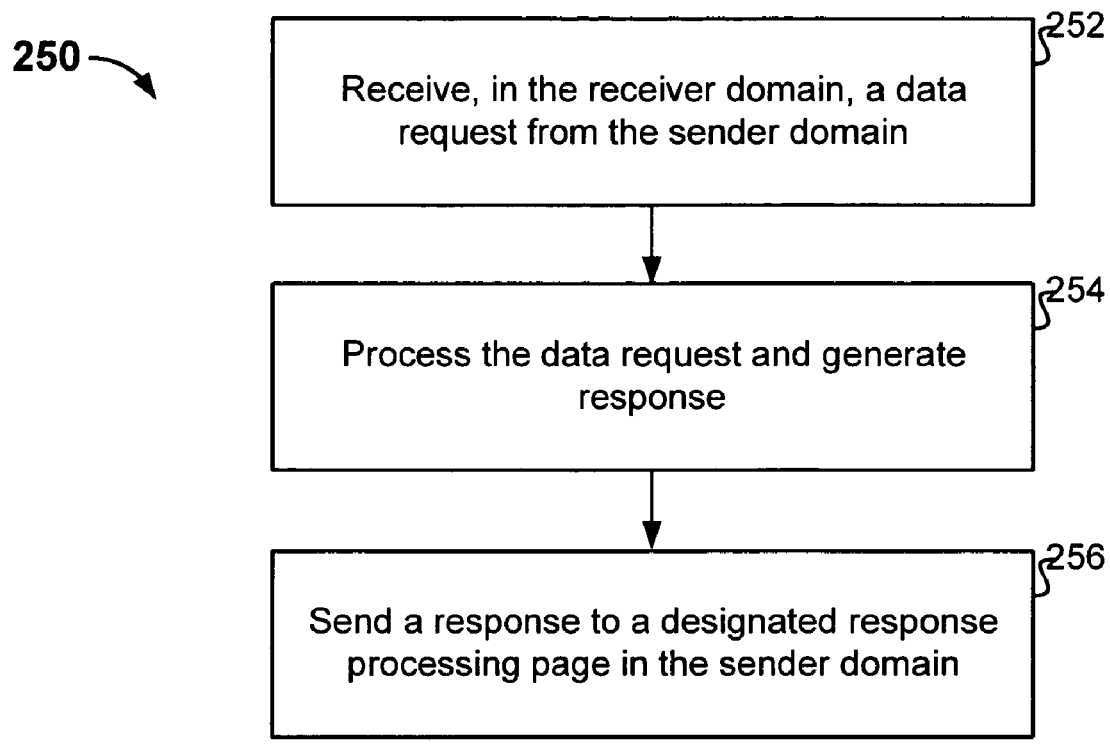
FIG. 2B is a flowchart illustrating an embodiment of a process for cross-domain communication.

FIG. 2B is a flowchart illustrating an embodiment of a process for cross-domain communication. Process 250 may be implemented on a device such as a server implementing services for domain 106.

At 252, a data request from the sender domain is received in the receiver domain. The data request is directed to a designated request processing page in the receiver domain.

At 254, the data request is processed. Information relating to the response is gathered and a response is generated.

At 256, the response is sent to a designated response processing page in the sender domain to be processed and passed on to the originating page as appropriate.

The above cross-domain communication technique observes the security isolation mechanisms of browser domains, without requiring decreased browser security standards, URL page jumping, or substantially increased server load. It guarantees fair and symmetrical security protection for both sides for communication.

Referring back to FIG. 1, before any cross-domain communication takes place, the server of the sender domain deploys a designated response processing page and the server of the receiver domain deploys a designated request processing page. During the course of cross-domain communication that is initiated by a client browser, the browser opens the designated pages to transfer data for cross-domain communication. As used herein, "deploy" refers to placing these page files on the appropriate server and "open" refers to sending a request to a page file by a client browser.

Initially, the client browser loads the originating page, which is a page that initiates cross domain communication. For example, the originating page may be a login page for the sender domain that requires certain information from the receiver domain (e.g., user account in the receiver domain) to complete the login process in the sender domain. The originating page locates the name of the sender domain, such as isv.com.

During the course of cross-domain data transfer, when an originating page in the sender domain sends a cross-domain transferring request and parameters to the receiver domain, the browser that loaded the originating page will open a hidden page on the server in the sender domain, use the hidden page to open a ASK page deployed on the server of the receiver domain and transfer the command and the data associated with the communication request using an URL fragment identifier of the request and the name property of a window object of the page.

The receiver domain receives the request command and data at the designated request processing page, also referred to as the ASK page. Data pertaining to the response of the request is extracted. Since the ASK page is located in the receiver domain, such as alisoft.com, it can acquire related data in the domain according to the request that is received.

Once the result data is obtained, the ASK page opens the designated response processing page (i.e., the ACK page) on the sender domain or opens another hidden page and uses the hidden page to open the ACK page and sends the returning position and the response data using an URL fragment identifier and the name property of window object of the page. Since the ACK page is located in the sender domain, such as isv.com, it can return the response data to the originating page in the same domain.

The ASK page is used for receiving request command for cross-domain transfer and extracting response data according to the command. The ACK page is used for receiving the response data sent by the ASK page and returning the response data to the originating page in the sender domain. The sender and receiver domains only need to exchange data via their respective servers the first time a specific cross-domain communication is made. In subsequent cross-domain transfers, the browser will use its cache function to cache the parameters sent the first time and the receiver of communication extracts the resulting data from the browser directly when receiving a cross-domain transfer request.

Figure 3:
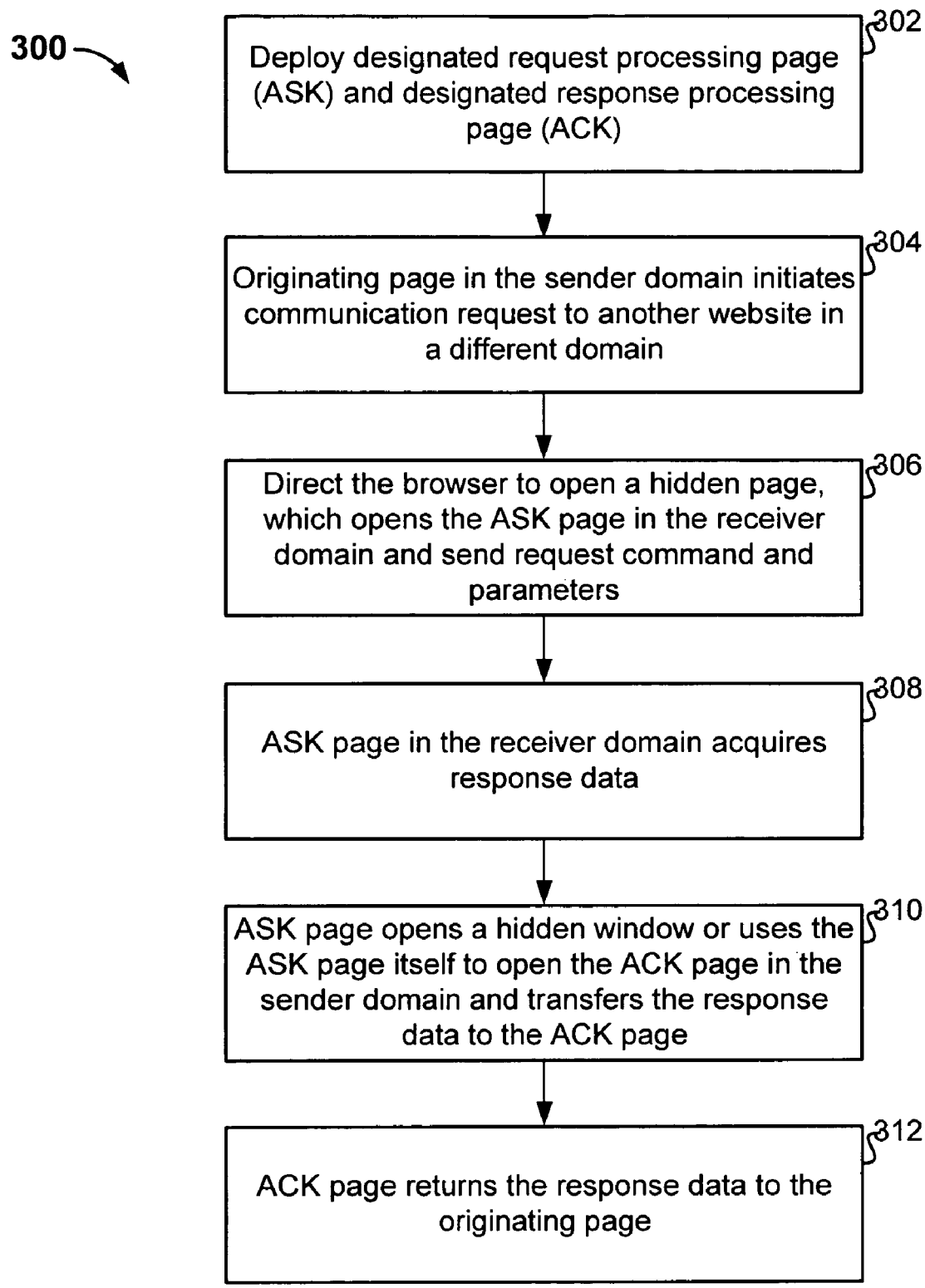
FIG. 3 is a flowchart illustrating another embodiment of a process for cross-domain communication.

FIG. 3 is a flowchart illustrating another embodiment of a process for cross-domain communication.

At 302, the servers on the sender and receiver domains deploy the designated response processing ACK page and the designated request processing ASK page, respectively. Bi-direction communications can be achieved by each domain deploying both an ACK page and an ASK page.

The designated request processing ASK page is a static page in some embodiments and a dynamic page in some embodiments where additional Hypertext Transfer Protocol (HTTP) header information is added. The response processing ACK page is a static page in some embodiments. ASK pages and ACK pages are basic pages for communication between two domains. They are collectively referred to as communication pages.

The communication pages agree on the same request format and follow the same communication protocol. In some embodiments, the HTTP GET request can be used for requesting page and command, and communication commands and data are not transferred as URL parameters.

At 304, when an originating page in a website sends a communication request to another website in a different domain, the browser of the originating page is directed to open a hidden page. In some embodiments, opening the hidden page includes opening an invisible new window or an invisible iframe.

At 306, the hidden page opens the ASK page deployed on the server of the receiver domain and request command and parameters are transferred.

In some embodiments, the request command is transferred in the form of a fragment identifier attached to the URL and the data can be transferred in the form of the name property of window object. Specifically, the fragment identifier is attached to the URL by appending a "#" identifier to the URL and appending a string to "#". A fragment identifier can be used for locating a designated anchor node (reading position) in a page and is processed by the client rather than the server. URLs with or without a fragment identifier or with different fragment identifiers are considered to be the same URL for the server and are cached the same way by the browser. Therefore, data is exchanged the first time the URL is requested and is cached in the browser and available for subsequent requests without requiring further data exchange between the servers and the browser.

At 308, after receiving the request, the ASK page in the receiver domain implements corresponding service and acquires response data.

At 310, the ASK page in the receiver domain opens a hidden new page or uses the ASK page itself to open the ACK page in the sender domain and transfers the response data to the ACK page in the sender domain.

The security isolation mechanism built into the browser forbids a program of a page in one domain to operate the content and data of another page directly. But when a page in one domain can open a page in another domain, transferring data to a page in the other domain is permitted in the form of URL or the name property of window object.

At 312, the ACK page in the original domain website returns the response data received to the originating page.

The steps above can be described by an example. For example, a typical request from a sender domain www.isv.com to a ASK page in a receiver domain www.alisoft.com is as follows:

http://www.alisoft.com/ASK.HTM#GetUserName/envoy123@www.isv.com

The page http://www.alisoft.com/ASK.HTM is requested for the user name of an email address envoy123@www.isv.com (GetUserName).

A typical response to the ASK page is as follows:
http://www.isv.com/ACK.HTM#bob321.

Strings bob321 to the page http://www.isv.com/ACK.HTM as the response to the request above.

Note that since the ACK page and the originating page are located in the same domain, the ACK page can visit the originating page and thus transfer the resulting data to the originating page.

In the example above, request and response data are transferred in form of strings in JSON format. JSON format is native data expression form for JavaScript language and has the advantages of simple form, compact format and convenient conversion. Data can be transferred by the name property of window object, by which large amount data can be transferred. Data also can be transferred all by fragment identifiers.

In some embodiments, in order to facilitate the use for developers, the data above can be packaged into a series of JavaScript functions to developers. For example: function envoy (domainName, serviceName, on Success, on Error), in which domainName is the domain name for communication, serviceName is the service name being requested, on Success indicates the return function upon success and on Error indicates the return function upon failure.

Safe communications among different domains are implemented with obeying the security isolation mechanism of browser domains completely, without requiring visitors to decrease security standards, URL page jumping nor requesting to servers frequently. It guarantees fair and symmetrical security protection for both sides for communication.

Figure 4:
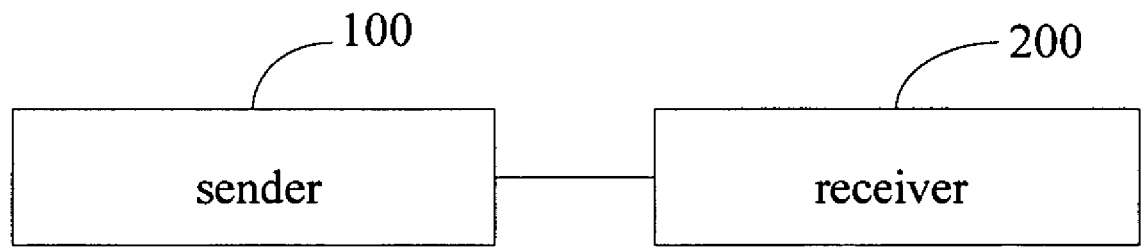
FIG. 4 is a system diagram illustrating an embodiment of a cross-domain communication system.

FIG. 4 is a system diagram illustrating an embodiment of a cross-domain communication system. In this example, the system includes a sender device 100 and a receiver device 200 that belong to different domains.

The sender 100 is implemented in some embodiments as a server configured to send a request to the designated request processing page on the receiver 200 and to receive a response sent by the designated request processing page on the receiver, at a designated local response processing page on the sender.

The receiver 200 is implemented in some embodiments as a server configured to receive the request sent by the sender 100 via the designated request processing page, processing the request sent by the sender 100 and acquiring response data and sending the response to the response processing page on receiver 100.

Figure 5:
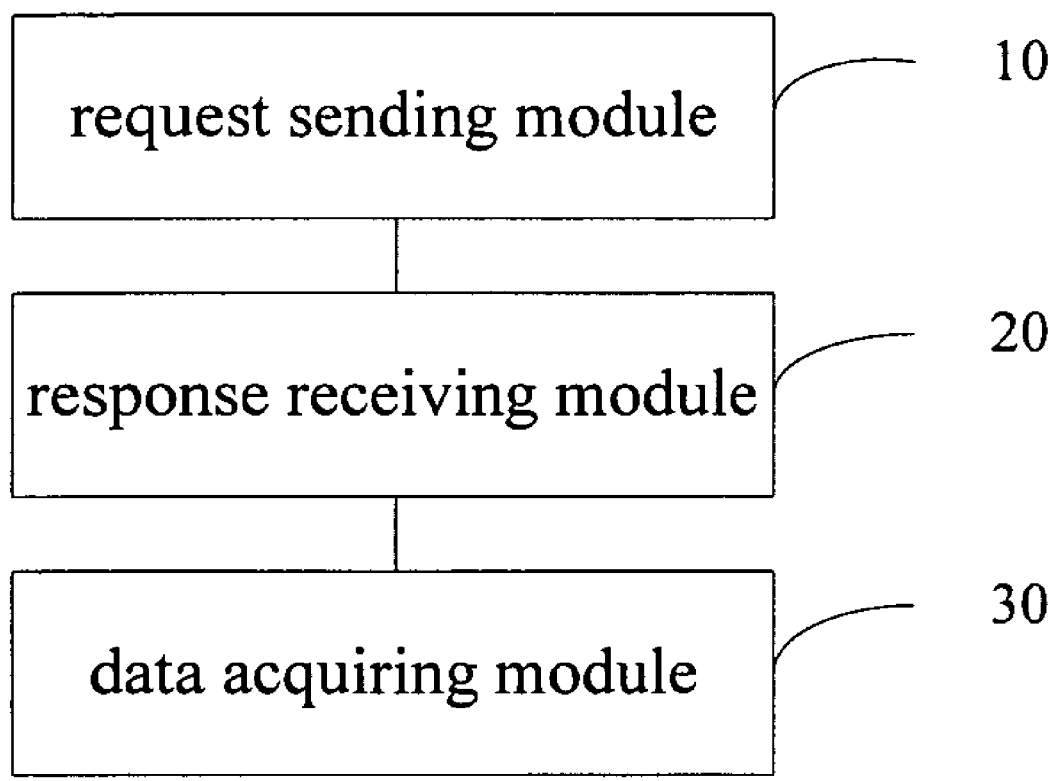
FIG. 5 is a block diagram illustrating an embodiment of a sender device.

FIG. 5 is a block diagram illustrating an embodiment of a sender device. In this example, the device includes a request sending module 10, a response receiving module 20 and a data acquiring module 30.

The request sending module 10 is configured to a request to the designated request processing page in the receiver. It further includes an originating page configured to send data such as the request command and associated data. The response receiving module 20 is configured to process a response sent by the receiver. It further includes a designated response processing page configured to receive the response. The data acquiring module 30 is configured to acquire the response from the page for receiving data in the sender.

Figure 6:
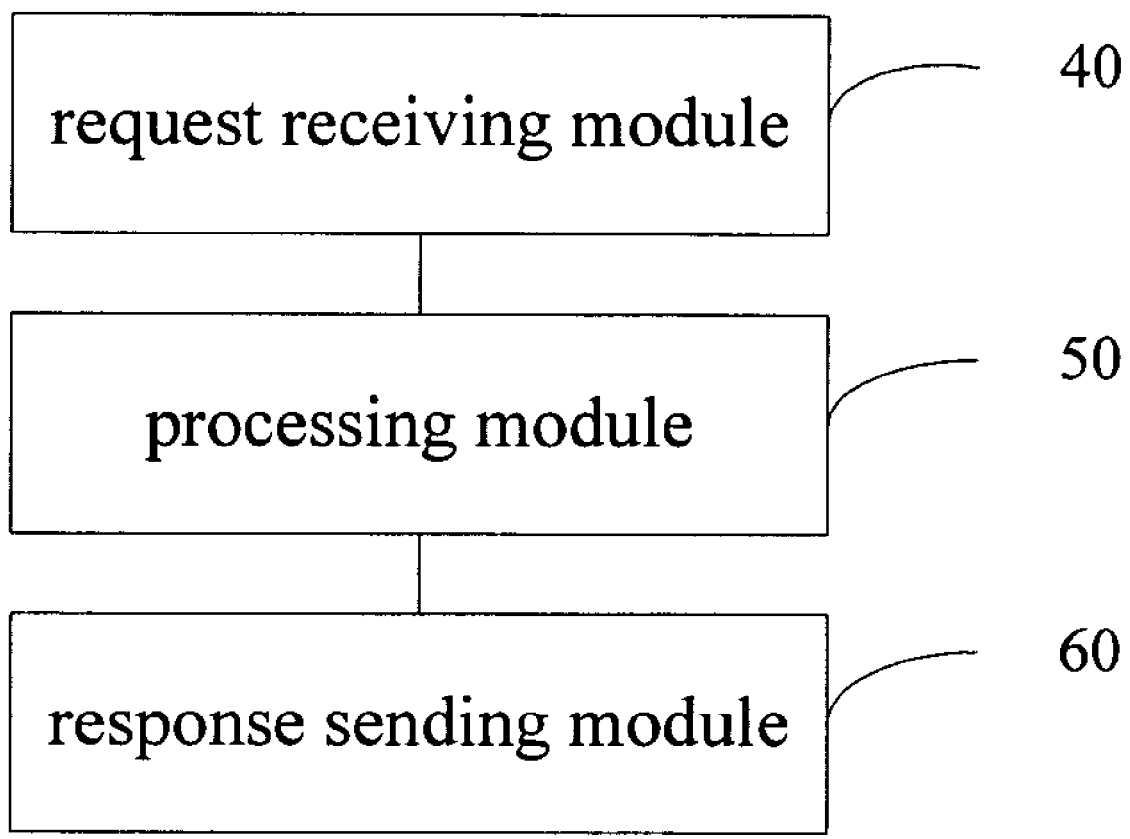
FIG. 6 is a block diagram illustrating an embodiment of a receiver device.

FIG. 6 is a block diagram illustrating an embodiment of a receiver device for cross-domain communication. The device in this example includes a request receiving module 40, a processing module 50 and a response sending module 60.

The request receiving module 40 is configured to receive a request from a sender. It further includes a designated request processing page configured to receive the request command and associated data. The processing module 50 is configured to process the request sent by the sender and to acquire response data. The response sending module 60 is used for sending the response to designated response processing page on the sender.

In some embodiments, a device may be configured both as a sender and a receiver and includes all the modules shown in FIGS. 5 and 6. In such embodiments, the designated request processing page and the designated response processing page can be different pages or the same page. The page(s) can be configured as dynamic pages or static pages.

Safe communications among different domains are implemented with obeying the security isolation mechanism of browser domains completely, without needing visitors to decrease security standards, URL page jumping nor requesting to servers frequently. It guarantees fair and symmetrical security protection for both sides for communication.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as CD-ROM, U disk, mobile hard disk, etc.), including a number of instructions for making a computer device (such as personal computers, servers, network equipments, etc.) implement the methods described in the embodiments of the present invention. The modules may be implemented on a single device or distributed across multiple devices. The functions of the modules may be merged into one another or further split into multiple sub-modules.

Through the description of the embodiments above, the technical personnel in this field can understand clearly that the present invention can be implemented by hardware or software and necessary current hardware platform. Based on this understanding, the technical program of the present invention can be embodied by a form of software products which can be stored in a nonvolatile storage medium (such as CD-ROM, U disk, mobile hard disk, etc.), including a number of instructions for making a computer device (such as personal computers, servers, or network equipments, etc.) implement the methods described in the embodiments of the present invention.

The descriptions above are just preferred implementation ways of the present invention. It should be pointed that, for general technical personnel in this field, some improvement and decorating can be done, which should be under the protection scope of the present invention.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A sender system for cross-domain communication between a sender domain and a receiver domain that is different from the sender domain, comprising:
    a hardware processor configured to:
        send a data request from an originating webpage deployed in the sender domain to the receiver domain, the data request being directed to a designated request processing page in the receiver domain, wherein sending the data request from the sender domain to the receiver domain includes opening a hidden page and using the hidden page to open the designated response processing page and to send a request command and associated request data via the hidden page, wherein opening the hidden page includes opening an invisible new window or an invisible iframe;
        receive a response from the receiver domain, the response including requested data and being directed to a designated response processing page in the sender domain, wherein the designated response processing page deployed in the sender domain is a different webpage from the originating webpage deployed in the sender domain; and
        process the response; and
    a memory coupled to the hardware processor, configured to provide the hardware processor with instructions.

2. The system of claim 1, wherein the data request is sent in response to a client action from a browser to an originating webpage in the sender domain.

3. The system of claim 1, wherein the designated request processing page is deployed in the receiver domain and the designated response processing page is deployed in the sender domain prior to the cross-domain communication.

4. The system of claim 1, wherein the data request includes a request command and associated request data that are sent via a Hypertext Transfer Protocol (HTTP) GET command.

5. The system of claim 1, wherein:
    the data request includes a request command and associated request data;
    the request command is sent as a fragment identifier attached to a uniform resource locator (URL); and
    the associated data are transferred as a name property of a window object.

6. The system of claim 1, wherein:
    the data request includes a request command and associated request data;
    the request command and the associated request data are sent as a fragment identifier attached to a URL.

7. The system of claim 1, wherein request is transferred as a string in JSON format.

8. The system of claim 1, wherein processing the response includes transferring response data from the designated response processing page to the originating webpage.

9. A method for cross-domain communication between a sender domain and a receiver domain that is different from the sender domain, comprising:
    sending a data request from an originating webpage deployed in the sender domain to the receiver domain, the data request being directed to a designated request processing page in the receiver domain, wherein sending the data request from the sender domain to the receiver domain includes opening a hidden page and using the hidden page to open the designated response processing page and to send a request command and associated request data via the hidden page, wherein opening the hidden page includes opening an invisible new window or an invisible iframe;
    receiving a response from the receiver domain, the response including requested data and being directed to a designated response processing page in the sender domain, wherein the designated response processing page deployed in the sender domain is a different webpage from the originating webpage deployed in the sender domain; and
    processing, by one or more hardware processors, the response.

10. The method of claim 9, wherein the data request is sent in response to a client action from a browser to an originating webpage in the sender domain.

11. The method of claim 9, wherein the designated request processing page is deployed in the receiver domain and the designated response processing page is deployed in the sender domain prior to the cross-domain communication.

12. The method of claim 9, wherein the data request includes a request command and associated request data that are sent via a Hypertext Transfer Protocol (HTTP) GET command.

13. The method of claim 9, wherein:
    the data request includes a request command and associated request data;
    the request command is sent as a fragment identifier attached to a uniform resource locator (URL); and
    the associated data are transferred as a name property of a window object.

14. The method of claim 9, wherein:
the data request includes a request command and associated request data;
the request command and the associated request data are sent as a fragment identifier attached to a URL.

15. The method of claim 9, wherein request is transferred as a string in JSON format.

16. A receiver system for cross-domain communication between a sender domain and a receiver domain that is different from the sender domain, comprising:
a processor configured to:
receive, in the receiver domain, a data request from an originating webpage deployed in the sender domain, the data request being directed to a designated request processing page in the receiver domain, wherein sending the data request from the sender domain to the receiver domain includes opening a hidden page and using the hidden page to open the designated response processing page and to send a request command and associated request data via the hidden page, wherein opening the hidden page includes opening an invisible new window or an invisible iframe;
process the data request to generate a response; and
send the response to the sender domain, the response being directed to a designated response processing page in the sender domain, wherein the designated response processing page deployed in the sender domain is a different webpage from the originating webpage deployed in the sender domain; and
a memory coupled to the processor, configured to provide the processor with instructions.

17. A method for cross-domain communication between a sender domain and a receiver domain that is different from the sender domain, comprising:
receiving, in the receiver domain, a data request from an originating webpage deployed in the sender domain, the data request being directed to a designated request processing page in the receiver domain, wherein sending the data request from the sender domain to the receiver domain includes opening a hidden page and using the hidden page to open the designated response processing page and to send a request command and associated request data via the hidden page, wherein opening the hidden page includes opening an invisible new window or an invisible iframe;
processing, by one or more hardware processors, the data request to generate a response; and
sending the response to the sender domain, the response being directed to a designated response processing page in the sender domain, wherein the designated response processing page deployed in the sender domain is a different webpage from the originating webpage deployed in the sender domain.

* * * * *